US011210428B2

(12) United States Patent
Zhu et al.

(10) Patent No.: US 11,210,428 B2
(45) Date of Patent: Dec. 28, 2021

(54) LONG-TERM ON-DEMAND SERVICE FOR EXECUTING ACTIVE-SECURE COMPUTATIONS

(71) Applicant: THE TRUSTEES OF INDIANA UNIVERSITY, Bloomington, IN (US)

(72) Inventors: Ruiyu Zhu, Bloomington, IN (US); Yan Huang, Greenwood, IN (US)

(73) Assignee: THE TRUSTEES OF INDIANA UNIVERSITY, Bloomington, IN (US)

(*) Notice: Subject to any disclaimer, the term of this patent is extended or adjusted under 35 U.S.C. 154(b) by 184 days.

(21) Appl. No.: 16/433,455

(22) Filed: Jun. 6, 2019

(65) Prior Publication Data

US 2019/0377908 A1 Dec. 12, 2019

Related U.S. Application Data

(60) Provisional application No. 62/681,254, filed on Jun. 6, 2018.

(51) Int. Cl.
| | |
|---|---|
| *G06F 21/78* | (2013.01) |
| *G06F 21/72* | (2013.01) |
| *G06F 21/60* | (2013.01) |
| *G06F 12/14* | (2006.01) |
| *G06F 11/00* | (2006.01) |
| *G06F 9/54* | (2006.01) |

(52) U.S. Cl.
CPC .............. *G06F 21/72* (2013.01); *G06F 11/00* (2013.01); *G06F 12/14* (2013.01); *G06F 21/602* (2013.01); *G06F 9/541* (2013.01)

(58) Field of Classification Search
None
See application file for complete search history.

(56) References Cited

U.S. PATENT DOCUMENTS

| 10,375,066 | B2* | 8/2019 | Chabanne | H04L 63/061 |
|---|---|---|---|---|
| 10,652,011 | B2* | 5/2020 | Bos | H04L 9/002 |
| 2011/0211692 | A1* | 9/2011 | Raykova | H04L 9/3218 |
| | | | | 380/46 |
| 2014/0040620 | A1* | 2/2014 | Kolesnikov | G09C 1/00 |
| | | | | 713/171 |
| 2015/0381349 | A1* | 12/2015 | Nikolaenko | G09C 1/00 |
| | | | | 713/189 |
| 2016/0196436 | A1* | 7/2016 | Kennedy | G06F 21/602 |
| | | | | 713/189 |

(Continued)

OTHER PUBLICATIONS

DUPLO: Unifying Cut-and-Choose for Garbled Circuits. Kolesnikov. ACM. (Year: 2017).*

(Continued)

*Primary Examiner* — Venkat Perungavoor
(74) *Attorney, Agent, or Firm* — Barnes & Thornburg LLP (57) ABSTRACT

Technologies are disclosed herein for running a long-term on-demand service for executing actively-secure computations. A function circuit may be represented as a stream of buckets, in which each bucket represents a logical AND gate. A pool having a plurality of garbled AND gates is generated. Garbled AND gates are randomly selected from the pool for placement in one of the buckets. An output for the bucket is determined by an evaluation of the selected garbled AND gates. The output represents an execution of the logical AND gate. The determined output is applied as a parameter in a secure protocol.

20 Claims, 7 Drawing Sheets

(56) References Cited

U.S. PATENT DOCUMENTS

2018/0019997 A1\* 1/2018 Chabanne .......... H04L 63/0861

OTHER PUBLICATIONS

Constant Round Maliciously Secure 2PC with Function-independent Preprocessing using LEGO. Nielsen. NDSS. (Year: 2017).\*
Pool: Scalable On-Demand Secure Computation Service Against Malicious Adversaries. Zhu. ACM. (Year: 2017).\*
CN 109756442. English Translation. (Year: 2013).\*
Encrypted Signal Processing for Privacy Protection. Lagendijk. IEEE. (Year: 2013).\*
2014. Circuits of Basic Functions Suitable for MPC and FHE. http://www.cs.bris.ac.uk/Research/CryptographySecurity/MPC/. (2014).
Arash Afshar, Zhangxiang Hu, Payman Mohassel, and Mike Rosulek. 2015. How to efficiently evaluate RAM programs with malicious security. In EUROCRYPT.
Donald Beaver, Silvio Micali, and Phillip Rogaway. 1990. The round complexity of secure protocols. In STOC.
Ran Canetti. 2000. Security and composition of multiparty crypto-graphic proto-cols. Journal of Cryptology 13, 1 (2000), 143-202.
Ran Canetti. 2001. Universally composable security: A new paradigm for crypto-graphic protocols. In FOCS. IEEE, 136-145.
Ivan Damgård, Marcel Keller, Enrique Larraia, Valerio Paslo, Peter Scholl, and Nigel P Smart. 2013. Practical covertly secure MPC for dishonest majority—or: breaking the SPDZ limits. In ESORICS.
Ivan Damgård, Valerio Paslo, Nigel Smart, and Sarah Zakarias. 2012. Multiparty computation from somewhat homomorphic encryption. In CRYPTO.
Jack Doerner, David Evans, et al. 2016. Secure Stable Matching at Scale. In ACM CCS.
Tore Kasper Frederiksen, Thomas Pelle Jakobsen, Jesper Buus Nielsen, Peter Se-bastian Nordholt, and Claudio Orlandi. 2013. Minilego: Efficient secure two-party computation from general assumptions. In EUROCRYPT.
Tore Kasper Frederiksen, Thomas P Jakobsen, Jesper Buus Nielsen, and Roberto Trifiletti. 2015. TinyLEGO: An Interactive Garbling Scheme for Maliciously Secure Two-party Computation. IACR Cryptology ePrint Archive 2015 (2015), 309.
Yan Huang, David Evans, Jonathan Katz, and Lior Malka. 2011. Faster Secure Two-Party Computation Using Garbled Circuits. In USENIX Security Symposium.
Yan Huang, Jonathan Katz, and David Evans. 2012. Quid-pro-quo-tocols: Strength-ening semi-honest protocols with dual execution. In IEEE Symposium on Security and Privacy.
Yan Huang, Jonathan Katz, Vladimir Kolesnikov, Ranjit Kumaresan, and Alex J Malozemoff. 2014. Amortizing garbled circuits. In CRYPTO.
Yuval Ishai, Joe Kilian, Kobbi Nissim, and Erez Petrank. 2003. Extending oblivious transfers efficiently. In CRYPTO.
Marcel Keller, Emmanuela Orsini, and Peter Scholl. 2015. Actively secure OT extension with optimal overhead. In CRYPTO.
Vladimir Kolesnikov, Payman Mohassel, Ben Riva, and Mike Rosulek. 2015. Richer efficiency/security trade-offs in 2PC. In TCC.
Vladimir Kolesnikov and Thomas Schneider. 2008. Improved garbled circuit: Free XOR gates and applications. In International Colloquium on Automata, Languages, and Programming.
Benjamin Kreuter, Abhi Shelat, and Chih-Hao Shen. 2012. Billion-Gate Secure Computation with Malicious Adversaries. In USENIX Security Symposium.
Yehuda Lindell and Ben Riva. 2014. Cut-and-choose Yao-based secure computa-tion in the online/offline and batch settings. In CRYPTO.
Yehuda Lindell and Ben Riva. 2015. Blazing fast 2pc in the offline/online setting with security for malicious adversaries. In ACM CCS.
Chang Liu, Xiao Shaun Wang, Kartik Nayak, Yan Huang, and Elaine Shi. 2015. Oblivm: A programming framework for secure computation. In IEEE Symposium on Security and Privacy.
Dahlia Malkhi, Noam Nisan, Benny Pinkas, Yaron Sella, et al. 2004. Fairplay—Secure Two-Party Computation System. In USENIX Security Symposium.
Alex Malozemoff and Xiao Wang. 2016. EMP-Toolkit. https://github.com/ emp-toolkit. (2016).
Kartik Nayak, Xiao Shaun Wang, Stratis Ioannidis, Udi Weinsberg, Nina Taft, and Elaine Shi. 2015. GraphSC: Parallel secure computation made easy. In IEEE Symposium on Security and Privacy.
Jesper Buus Nielsen, Peter Sebastian Nordholt, Claudio Orlandi, and Sai Sheshank Burra. 2012. A new approach to practical active-secure two-party computation. In CRYPTO.
Jesper Buus Nielsen and Claudio Orlandi. 2009. LEGO for two-party secure computation. In TCC.
Jesper Buus Nielsen, Thomas Schneider, and Roberto Trifiletti. 2017. Constant Round Maliciously Secure 2PC with Function-independent Preprocessing using LEGO. In NDSS.
Chris Peikert, Vinod Vaikuntanathan, and Brent Waters. 2008. A framework for efficient and composable oblivious transfer. In CRYPTO.
Peter Rindal and Mike Rosulek. 2016. Faster malicious 2-party secure computation with online/offline dual execution. In USENIX Security Symposium.
Ebrahim M Songhori, Siam U Hussain, Ahmad-Reza Sadeghi, Thomas Schneider, and Farinaz Koushanfar. 2015. Tinygarble: Highly compressed and scalable sequential garbled ciicuits. In IEEE Symposium on Security and Privacy.
Xiao Wang, Hubert Chan, and Elaine Shi. 2015. Circuit oram: On tightness of the goldreich-ostrovsky lower bound. In CCS.
Xiao Wang, Chang Liu, Yan Huang, Kartik Nayak, Elaine Shi, and Michael Hicks. 2014. ObliVM. https://github.com/oblivm. (2014).
Xiao Wang, Alex J Malozemoff, and Jonathan Katz. 2017. Faster Secure Two-Party Computation in the Single-Execution Setting. In EUROCRYPT.
Xiao Wang, Samuel Ranellucci, and Jonathan Katz. 2017. Authenticated gar-bling and efficient maliciously secure two-party computation. Technical Report. Cryptology ePrint Archive, Report 2017/030.
Xiao Shaun Wang, Yan Huang, TH Hubert Chan, Abhi Shelat, and Elaine Shi. 2014. SCORAM: oblivious RAM for secure computation. In ACM CCS.
Xiao Shaun Wang, Yan Huang, Yongan Zhao, Haixu Tang, XiaoFeng Wang, and Diyue Bu. 2015. Efficient genome-wide, privacy-preserving similar patient query based on private edit distance. In ACM CCS.
Samee Zahur and David Evans. 2014. Obliv-C: A Language for Extensible Data—Oblivious Computation. (2014).
Samee Zahur, Xiao Wang, Mariana Raykova, Adrià Gascón, Jack Doemer, David Evans, and Jonathan Katz. 2016. Revisiting square-root oram: Efficient random access in multi-party computation. In IEEE Symposium on Security and Privacy.
Ruiyu Zhu and Yan Huang. 2017. Faster LEGO-based Secure Computation without Homomorphic Commitments. (2017). Cryptology ePrint Archive, Report 2017/226.
Ruiyu Zhu, Yan Huang, Abhi Shelat, and Jonathan Katz. 2016. The Cut-and-Choose Game and its Application to Cryptographic Protocols. In USENIX Security Symposium.
Moni Naor and Benny Pnkas. 2001. Efficient oblivious transfer protocols. In SODA.

\* cited by examiner

```
class Party {
public:
   /* Encode an input bit of garbler. */
   virtual wire** garblerIn(bool* b, int len)=0;
   virtual wire** garblerIn(int len)=0;

/* Encode an input bit of evaluator. */
   virtual wire** evaluatorIn(bool* b, int len)=0;
   virtual wire** evaluatorIn(int len)=0;

/* Reveal an output bit to garbler. */
   virtual bool garblerOut(wire* w)=0;

/* Reveal an output bit to evaluator. */
   virtual bool evaluatorOut(wire* w)=0;

/* Basic binary gates */
   virtual wire* and(wire* l, wire* r)=0;
   virtual wire* xor(wire* l, wire* r)=0;

/* APIs for RAM accesses using ORAM */
   wire** initRAM(int nBlk, int sz);
   wire** accessRAM(wire** mem, wire** rORw,
         wire** index, wire** data);

/* Run the computation specified by the
      function 'f' using 'ws'. */
   wire** exec((wire**)f(wire**), wire** ws);

/* Run the computation specified in the
      circuit file 'f' using 'ws'. */
   wire** exec(File* f, wire** ws);
} class Garbler: public Party {
public:
   wire** garblerIn(bool* b, int len) { ... }
   wire** garblerIn(int len) { ... }
   wire** evaluatorIn(bool* b, int len) { ... }
   wire** evaluatorIn(int len) { ... }
   bool garblerOut(wire* wire) { ... }
   bool evaluatorOut(wire* wire) { ... }
   wire* and(wire* l, wire* r) { ... }
   wire* xor(wire* l, wire* r) { ... }
} class Evaluator: public Party {
public:
   wire** garblerIn(bool* b, int len) { ... }
   wire** garblerIn(int len) { ... }
   wire** evaluatorIn(bool* b, int len) { ... }
   wire** evaluatorIn(int len) { ... }
   bool garblerOut(wire* wire) { ... }
   bool evaluatorOut(wire* wire) { ... }
   wire* and(wire* l, wire* r) { ... }
   wire* xor(wire* l, wire* r) { ... }
}
```

```
// Common application code
wire* mux(wire* x, wire* y, wire* c) {
  return xor(and(c, xor(x,y)), y)
} wire mux8(wire ws) {
  wire* x = *ws, y = *ws+8, c= *ws+16;
  wire** ret = new wire*[8];

for(int i=0; i<8; i++){
    ret[i] = mux(x+i, y+i, c);
  }
  return ret;
}

// Alice's main function
void main() {
  Garbler alice = new Garbler();
  bool inputA[9] = int2bits(0x01AA);
  wire **wsA = alice.garblerIn(inputA, 8);
  wire **wsB = alice.evalautorIn(8);
  wire **ws = new wire*[17];
  for(int i=0; i<8; i++) {
    *ws[i  ]=*wsA[i];
    *ws[i+8]=*wsB[i];
  }
  *ws[16] = **alice.garblerIn(inputA+8, 1)
      ;
  wire **os = alice.exec(mux8, ws);
  bool* ret = new bool[8];
  for(int i=0; i<8; i++)
    evaluatorOut(os[i]);
  delete os;
}

// Bob's main function
void main() {
  Evaluator bob = new Evaluator();
  bool inputB[8] = int2bits(0xBB);
  wire **wsA = bob.garblerIn(8);
  wire **wsB = bob.evalautorIn(inputB, 8);
  wire **ws = new wire*[17];
  for(int i=0; i<8; i++) {
    *ws[i  ]=*wsA[i];
    *ws[i+8]=*wsB[i];
  }
  *ws[16] = **bob.garblerIn(1);
  wire **os = bob.exec(mux8, ws);
  bool* ret = new bool[8];
  for(int i=0; i<8; i++)
    ret[i] = evaluatorOut(os[i]);
  printf("%d", bits2int(ret));
  delete os;
}
```

LONG-TERM ON-DEMAND SERVICE FOR EXECUTING ACTIVE-SECURE COMPUTATIONS

CROSS-REFERENCE TO RELATED APPLICATIONS

The present disclosure claims the benefit of U.S. Provisional Patent Application Ser. No. 62/681,254, entitled "Long-Term On-Demand Service for Executing Active-Secure Computations," filed Jun. 6, 2018, which is incorporated herein by reference in its entirety.

GOVERNMENT LICENSE RIGHTS

This invention was made with government support under 1464113 awarded by the National Science Foundation. The government has certain rights in the invention.

FIELD

The present disclosure relates generally to secure computations, and more specifically to a service providing a framework for executing on-demand and scalable secure computations.

BACKGROUND

Secure computation is a technique for safely utilizing sensitive data owned by two or more distrustful parties. A number of breakthroughs have advanced the practicality of secure computation. These breakthroughs can be applied towards an on-demand service between two collaborating parties. An example of parties that may use this service include credit card issuers that collaboratively mine personal transaction databases via a secure computation protocols to identify credit card fraud. Another example includes medical research institutions that conduct secure cross-database queries over sensitive medical records, which can involve private computations (e.g., in a random access machine (RAM) model).

However, currently existing services have limitations with regard to scalability and efficiency. For example, one approach provides efficient gate execution but does not efficiently handle certain reactive computations, such as RAM-based computation, against active adversaries. Another approach requires knowing a target function well in advance and also requires substantial offline processing. Many of these approaches incur a prohibitive amount of time and memory in offline processing and are thus not suited for large computations.

SUMMARY

Embodiments presented herein disclose a computer-implemented method for performing secure computation of a function circuit represented as a plurality of buckets. Each bucket represents a logical AND gate. The method generally includes generating, by execution of one or more processors, a pool having a plurality of garbled AND gates. At least one of the garbled AND gates are randomly selected in the pool for placement in one of the plurality of buckets. By an evaluation of the selected garbled AND gates, an output of the bucket is determined. The output represents an execution of the logical AND gate.

Another embodiment presented herein discloses a computer-readable storage medium storing instructions, which, when executed by a processor, performs an operation for performing secure computation of a function circuit represented as a plurality of buckets. Each bucket represents a logical AND gate. The operation itself generally includes generating, by execution of one or more processors, a pool having a plurality of garbled AND gates. At least one of the garbled AND gates are randomly selected in the pool for placement in one of the plurality of buckets. By an evaluation of the selected garbled AND gates, an output of the bucket is determined. The output represents an execution of the logical AND gate.

Yet another embodiment presented herein discloses a system having a processor and a memory storing program code, which, when executed on the processor, performs an operation for performing secure computation of a function circuit represented as a plurality of buckets. Each bucket represents a logical AND gate. The operation itself generally includes generating, by execution of one or more processors, a pool having a plurality of garbled AND gates. At least one of the garbled AND gates are randomly selected in the pool for placement in one of the plurality of buckets. By an evaluation of the selected garbled AND gates, an output of the bucket is determined. The output represents an execution of the logical AND gate.

BRIEF DESCRIPTION OF THE DRAWINGS

FIG. 4 illustrates a simplified conceptual diagram of at least one embodiment of an example application programming interface (API) for a framework used to provide scalable secure computation;

DESCRIPTION OF THE ILLUSTRATIVE EMBODIMENTS

For the purposes of promoting an understanding of the principles of the present disclosure, reference will now be made to a number of illustrative embodiments shown in the attached drawings and specific language will be used to describe the same.

Embodiments presented herein disclose techniques for providing a scalable and on-demand secure computation service. More particularly, embodiments presented herein provide an actively-secure computation framework that provides a relatively short amortized time in computation and further performs actively secure computations as a long-term service between mutually-distrusted organizations.

Figure 1:
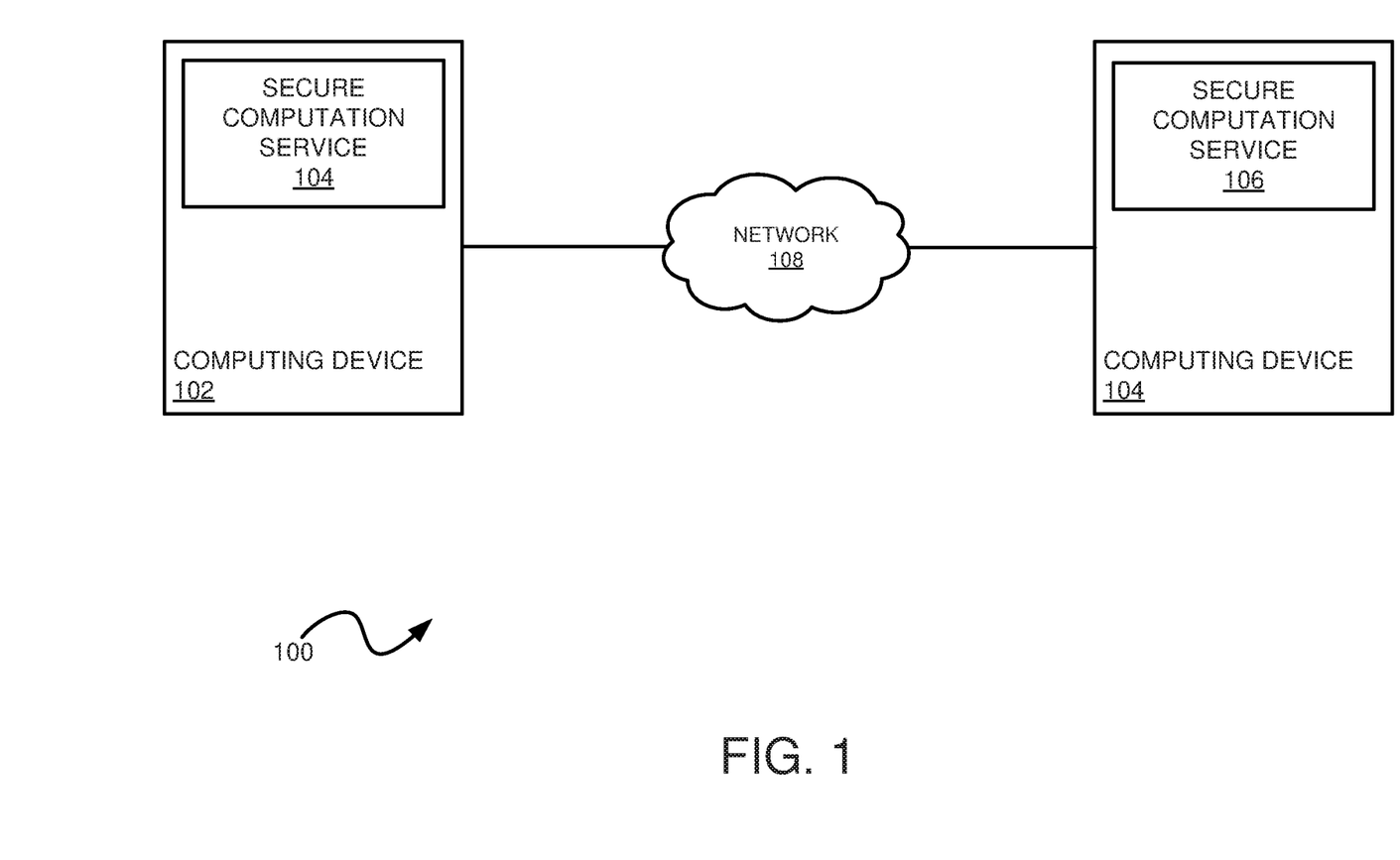
FIG. 1 illustrates a simplified block diagram of at least one embodiment of an example computing environment in which a secure computation service using a pool of garbled gates is provided.

Referring now to FIG. 1, an example computing environment in which a secure computation service 104, 106 (executing on computing devices 102, 104, respectively) is shown. As further described herein, the service computation service 104, 106 provides a framework that maintains a pool for garbled gate entries used in cut-and-choose operations. The pool allows a service executing on either of the computing devices 102, 104 (e.g., communicating with one another over a network 108, e.g., the Internet) to perform secure computation (e.g., though BatchedCut operations) without periodically incurring long delays and large storage demands from offline processing. Doing so can result in reliable and consistent service using relatively moderate resources.

In an embodiment, the secure computation service 104, 106 may apply garbled circuits. Generally, garbled circuits allow parties holding inputs x and y to evaluate an arbitrary function $f(x,y)$ in such a manner that information about a given party's input is not leaked to the other party (beyond what is implied by the output of the function). In particular, a circuit generating party associates two random cryptographic keys $w_i^0$, $w_i^1$ with each wire i of a Boolean circuit for $f$. The circuit generating party computes ciphertexts $$Enc^k_{\substack{b_i,b_j \\ w_i^{b_i} w_j^{b_j}}} \left( w_k^{g(b_i,b_j)} \right)$$

for each binary gate g of a circuit with input wires i, j, and output wire k, for all inputs $b_i$, $b_j \in \{0,1\}$. The resulting four ciphertexts constitute a garbled gate. The collection of the garbled gates forms the garbled circuit to send to a circuit evaluating party. The circuit generating party reveals the mapping from output-wire keys to bits.

In an embodiment, the secure computation service 104, 106 may also apply a cut-and-choose technique. The cut-and-choose technique ensures that a garbled circuit sent by the garbler is constructed correctly. The circuit generator produces and sends several garbled circuits. The circuit evaluator checks a random subset and evaluate the rest to determine the final result. BatchedCut is an example of a cut-and-choose protocol. In the BatchedCut protocol, the parties batch the cut-and-choose procedure either across multiple instances of an application or at gate level.

Further, reactive functionalities, such as RAM-based secure computations, can be cumbersome to handle by some cut-and-choose mechanisms. In an embodiment, the framework may also apply Large Efficient Garbled-circuit Optimization (LEGO) protocols, which are a type of BatchedCut protocol. For a Boolean circuit C of N logical AND gates, a LEGO protocol includes a first party generating a total of T garbled AND gates. Further, a second party randomly picks B·N garbled ANDs (where B represents a bucket size) and groups the garbled ANDs into N buckets. Each bucket will realize an AND in C. The second party evaluates every bucket by translating wire labels on the input-wires of the bucket to wire labels on input wires of the individual garbled gate. The second party then translates the obtained wire labels on the output wires of the garbled gates to a wire label on the output wire of the bucket. The second party checks each of the rest of the T-BN garbled AND gates for correctness. If faulty, then the second part aborts. The first party reveals the secret mapping on the final output wires of the circuit so that the second party is able to map the final output wire labels into their logical bit values.

Figure 2:
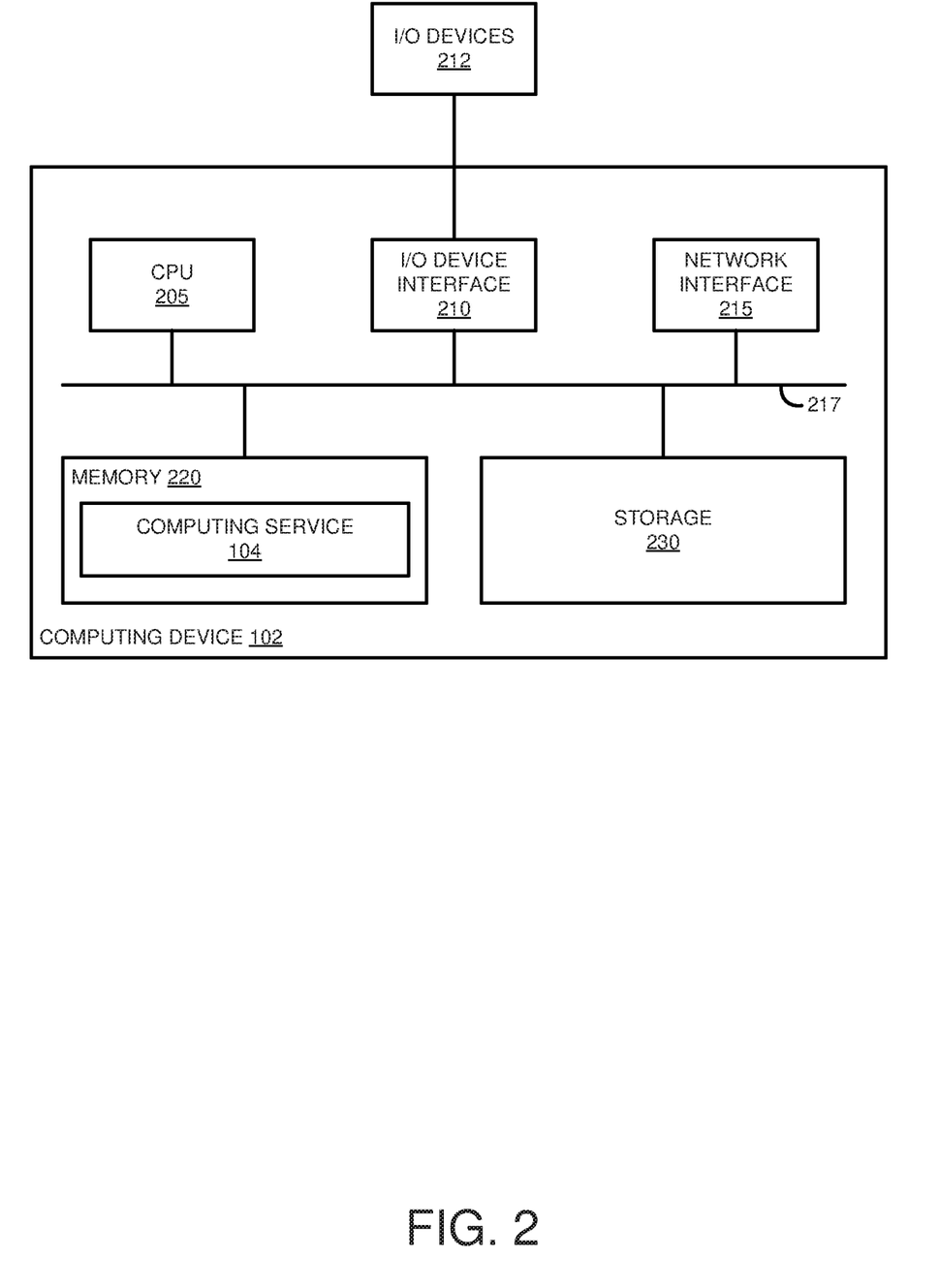
FIG. 2 illustrates a simplified block diagram of at least one embodiment of one of the computing devices described relative to FIG. 1.

Referring now to FIG. 2, the computing server 102, includes, without limitation, a central processing unit (CPU) 205, an I/O device interface 210, a network interface 215, a memory 220, and a storage 230, each interconnected via an interconnect bus 217. Note, CPU 205 is included to be representative of a single CPU, multiple CPUs, a single CPU having multiple processing cores, and the like. Memory 220 is generally included to be representative of a random access memory. Storage 230 may be a disk drive storage device. Although shown as a single unit, storage 230 may be a combination of fixed and/or removable storage devices, such as fixed disc drives, removable memory cards, or optical storage, network attached storage (NAS), or a storage area network (SAN). The I/O device interface 210 may provide a communications interface between the computing server 102 and I/O devices 212. The I/O devices 212 may be embodied as any type of input/output device connected with or provided as a component to the computing server 102. Example I/O devices 212 include a keyboard, mouse, sensors, diagnostic equipment, speakers, interface devices, and other types of peripherals. The network interface 215 may be embodied as any communication circuit, device, or combination thereof, capable of enabling communications over a network between the computing server 102 and other devices (e.g., the client device 110). The network interface 215 may be configured to use any one or more communication technologies (e.g., wired or wireless communications) and associated protocols (e.g., Ethernet, Bluetooth, WiFi, etc.) to perform such communication. Illustratively, the memory 220 includes the secure computation service 104. The storage 230 may be used to store a pool of garbled AND gates for use as parameters in performing secure computations. Note, the description of the components of the computing device 102 may also be found in the computing device 104. Further, the illustrative computing device 102 may include additional components or omit components depicted in FIG. 2.

Figure 3:
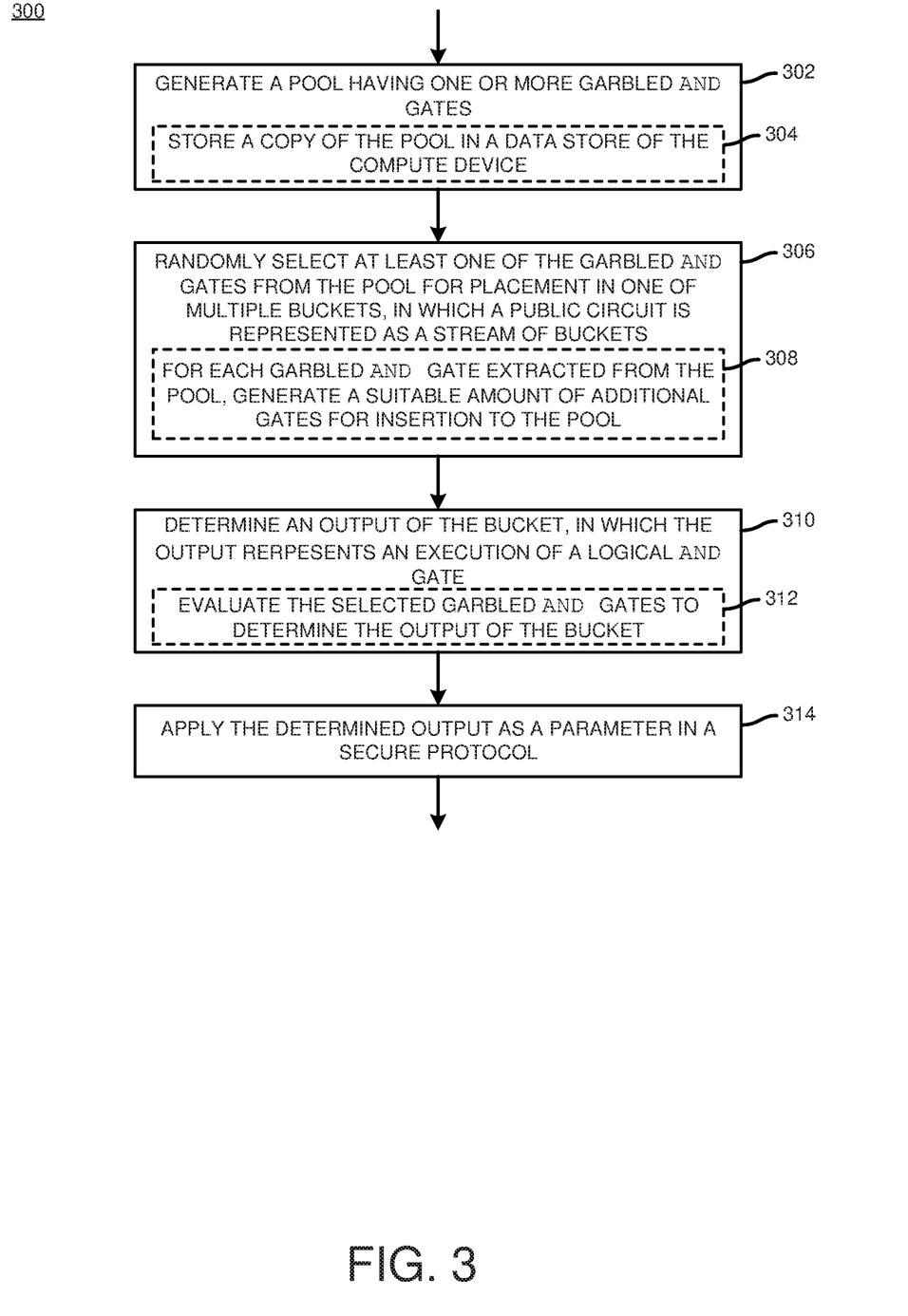
FIG. 3 illustrates a simplified flow diagram of at least one embodiment of a method for performing a secure computation via one of the computing devices described relative to FIG. 1.

Referring now to FIG. 3, the computing device 102, in operation (e.g., via the secure computation service 104), may perform a method 300 for performing secure computation using a pool of garbled gates. Note, any function $f$ can be completed using a set of AND and XOR gates. Although XOR can be securely computed without interaction, AND gates should be garbled. Executing the whole circuit can be viewed as a sequential traversal of all logical AND gates in topological order. Using LEGO protocols, every logical AND gate is represented by a bucket of garbled ANDs randomly drawn by the pool. Thus, $f$ may be represented as a stream of buckets shown on the right portion of FIG. 1.

The approach assumes that both parties, e.g., computer servers executing a service providing the framework, have access to the same pool of garbled AND gates. As shown, the method 300 begins in block 302, in which the computing device 102 generates a pool having one or more garbled AND gates. In an embodiment, the pool is built once throughout the lifetime of the servers. To build the pool, a process (referred to herein as "fill_pool") is conducted in which the following steps may be performed and repeated until the pool is completely filled. The garbler generates a garbled AND gate ℶ. Based on a random bit with bias $r_c$ (e.g., the bit turns out 1 with probability $r_c$ ($0<r_c<1$) and 0 with probability $1-r_c$), the parties decide whether to verify ℶ for correctness (happening with probability $r_c$) or to place ℶ into the pool (with probability $1-r_c$). An honest part aborts if ℶ is found to be faulty. Note, it is not necessary that every faulty gate can be detected as faulty when being checked (e.g., the detection rate $r_d \le 1$). The size of the pool, n, is a parameter configurable based on the trade-off between performance and budget. The randomness used in the decision step comes from a collaborative coin-tossing protocol (and hence is unpredictable to the garbler). Further, in block 304, the computing device 102 stores a copy of the generated pool in a data store (e.g., the storage 230). To store each AND gate, the garbler may maintain three wires and a garbled-table whereas the evaluator may maintain the commitments/i-hashes of the three wires and a garbled-table. Note, the computing device 104 (or any other computing device with which the computing device is performing secure computation) may also store a copy of the generated pool.

Further, assume the bucket size is B. To execute a logical AND gate in the stream, each server runs a process (referred to herein as "exec_bucket"). In block 306, the computing device 102 randomly selects at least one of the garbled AND gates from the pool for placement in one of the buckets. In the exec_bucket process, B garbled ANDs are randomly picked from the pool and put into a bucket. The bucket evaluation procedure of an underlying LEGO protocol is called to evaluate all the gates in this bucket to derive output wire-label of the bucket. Further, in block 308, the computing device 102 may, for each garbled AND gate retrieved from the pool, generate a suitable amount of additional gates for insertion to the pool. For example, a fill_pool process may be performed repeatedly until the pool is again completely filled. The pool should be full before and after executing a logical AND gate.

For an adversarial garbler, the amount of faulty gates to succeed in an attack depends on the security premise of the underlying LEGO protocol. For example, using a bucket-level MajorityCut-able protocol requires B/2 gates in a bucket to be faulty, whereas a bucket-level SingleCut-able protocol requires all B gates in a bucket to be faulty in a successful attack. Many LEGO-style protocols may be adapted to the techniques described herein, without loss of generality. For example, the protocol described in "Faster LEGO-based Secure Computation without Homomorphic Commitments" (Ruiyu Zhu and Yan Huang) may provide a reliable security guarantee ($r_d = \frac{1}{2}$ and a single good gate in each bucket suffices to ensure security).

Using the described protocol, the techniques described herein bound the probability of a successful attack to the cut-and-choose mechanism by a preset threshold ε, throughout the lifetime of the pool. In such a case, as a guard measure, assume every garbled-gate is always selected to be checked with a constant probability rc. A malicious garbler may attempt to subvert this approach by inserting all b bad gates into the pool when the pool is initially set up. This is because the attacker will take the same risk of being detected when b bad gates eventually slip into the pool. However, getting the b bad gates into the pool earlier results to a better chance of successful attacks because, in absence of successful attacks, drawing gates from the pool to fill the buckets will consume (the limited number of) bad gates in the pool, hence reducing the probability of successful attacks.

Assume that b is an upper-bound on the number of bad gates that has ever passed through the guard measure and entered the pool before a successful attack. Let $P_B(n,b)$ be the probability of a successful attack throughout the lifetime of a pool of size-n and bucket-size-B provided that at most b bad gates are ever successfully inserted into the pool. Once $P_B(n,b)$ is obtainable for every n and b, the success rate of the best attacking strategy can be upper-bounded by $$\max_b (1 - r_c r_d)^b \cdot P_B(n, b), \qquad (1)$$

for a fixed n, $r_c$ and any positive integer b (consider an integer b that is no larger than $\lfloor \log_{1-r_c r_d} \varepsilon \rfloor$, since this is the maximum number of bad gates that can be successfully inserted into the pool without being caught with probability larger than ε).

In block 310, the computing device 100 determines an output of the bucket, in which the output represents an execution of a logical AND gate. More particularly, in block 312, the computing device 100 may evaluate the selected garbled AND gates to determine the output. For instance, a recurrence is derived that allows $P_B(n,b)$ to be computed. Assume there are k bad gates left in the pool. On every draw of B gates, the probability that i bad gates are picked is $$\binom{n-k}{B-i}\binom{k}{i} \Big/ \binom{n}{B}.$$

If i<B, then i bad gates are consumed so a future attack will succeed with probability $P_B(n, k-i)$. If i=B, which happens with probability of $$\binom{k}{B} \Big/ \binom{n}{B},$$

an attack succeeds. Thus, P(n, k) can be written as a weighted sum of $\{P_B(n,i)\}_{i=k-B}^{k}$, where the weights are the probabilities that i bad gates are selected:

$$P_B(n, k) = \sum_{i=0}^{B-1} P_B(n, k-i) + \frac{\binom{k}{B}}{\binom{n}{B}}, \forall k \ge B$$

$$P_B(n, k) = 0, \forall k < B$$

Note that when k<B, there are less than B bad gates in the pool, so at least one good gate appears in each bucket from that point on, hence $P_B(n, k)=0$. Therefore, once n and B are fixed, $P_B(n, 1), \ldots, P_B(n,b)$ can be computed using dynamic programming altogether in O(b) time.

In block 314, the computing device 102 applies the determined output as a parameter in a secure protocol. For example, in existing BatchedCut protocols, identifying cut-and-choose parameters for a particular circuit size and security parameter often requires considerable human intervention in making heuristic guesses. Such ad hoc procedures are incompatible with the expectation of running dynamically-supplied functions on-the-fly. To address such concerns, in an embodiment, one approach involves identifying, via a search technique, a ($r_c$, B) for any fixed (ε,n), in which ε corresponds to a probability of a successful attack throughout the lifetime of the pool and n corresponds to the size of the pool.

According to the search technique, a ($r_c$, B) should be chosen such that the result of equation (1)≤ε holds while $B/(1-r_c)$ is minimized, because $B/(1-r_c)$ gates are expected to be garbled per bucket, in which $r_c$ corresponds to a probability of a freshly generated garbled gate being checked and B corresponds to a bucket size. The technique considers every possible integral B in an increasing order. When examining each potential B value, the technique includes determining the smallest $r_c$ that allows the security constraint of the result of equation (1)$\leq \varepsilon$ to hold. The security constraint was derived assuming $r_c > r_0$, hence if a smaller $r_c$ is obtained, the technique includes discarding such $r_c$ and decreasing $r_0$ by ½ and recalculating $r_c$ until a $r_c > r_0$ is found. The technique then includes recording the resulting $B/(1-r_c)$ value if it is smaller than the by-far smallest cost indicator t. The technique includes examining bigger bucket sizes when there are no smaller feasible cost indicator t values present.

For the technique, it suffices to start the search from B=2 because B=1 degenerates to semi-honest garbled circuit protocol and thus will not offer a productive result. Further, any (r, B) satisfying the inequality of step (2) of technique is a security-wise viable parameter. However, the smallest $r_c$ (for that B) satisfying this constraint to minimize $B/(1-r_c)$ is desirable. This can be accomplished efficiently through a binary search between $r_0$ and 1, because the left-hand-side of the inequality strictly decreases when $r_c$ grows. Further still, in step 3 of technique, if $r_0$ is greater than $r_c$, then it is uncertain that the $r_c$ obtained is the smallest possible (for that B). Otherwise, that $r_c$ is optimal for the current B. In addition, at the conclusion of the technique, t<B and thus t<$B/(1-r_c)$ for all $r_c$. Therefore, searching further cannot yield any smaller t and the output ($r_c^*$, B*) is optimal. As another note, initiating $r_0$ to 0.01 is arbitrary because $r_0$ can be initiated to any decimal between 0 and 1. However, in practice, setting $r_0$ to 0.01 eliminates the need to resetting $r_0$ and restarting the search for every n evaluated (assuming $\varepsilon = 2^{-40}$).

Because any Boolean circuit can be computed using AND and XOR gates and secure XOR can be realized without garbling, it suffices to have a single pool of garbled AND gates to realize any function. However, garbled gadgets, treated as a whole, can be realized more efficiently than composed from individual AND gates. In such circumstances, the servers can maintain multiple pools, each with a different type of garbled gadgets. The security analysis remains the same for additional pools.

Costs for the approach described herein include the time for initializing the pool, the storage for storing the pool, and the time for replenishing the pool. The time to initialize the pool may be the pool size n multiplied by $R_g/(1-r_c)$ where $R_g$ is the speed of garbled-gate generation and rc is determined by n and $\varepsilon$ in a way described earlier. As stated, the pool only need to be generated once in the lifetime of running the servers. Likewise, the non-amortizable time required to replenish the pool is $B \times R_g/(1-r_c)$ per gate in the target Boolean circuit. The storage costs of the pool can depend on n but also the role of a server, since the garbler remembers wires whereas the evaluator only need to store the (shorter) i-hashes of wires. It is also note that the circuit evaluator can even hash every garbled gate it receives and organize all the hashes with a Merkle tree. Thus, at a logarithmic cost of operating the Merkle tree, only a single root hash needs to be stored on the evaluator side.

In an embodiment, the secure computation service 104 may use secure multiplexers for computations such as private set intersection and ORAM (Oblivious Random Access Memory). Generally, an l-bit MUX takes two l-bit inputs (say, $x_0$ and $x_1$), a 1-bit choice signal c, and outputs an l-bit output $x_c$. One approach implements an l-bit MUX by repeatedly calling a 1-bit MUX l times. In an embodiment, the l AND gates in an l-bit MUX share a common input bit, i.e., the selection bit of the MUX. To exploit this observation, an optimized l-bit MUX is based on a single special (l+1)-input l-output circuit gadget (also referred to herein as MUXCORE) and a few XOR gates. MUXCORE may be realized in the following pseudocode:

```
MUXCORE(a[l], c) {
    for i from 1 to l
        ret[i] <- a[i] ^ c
    return ret;
}
```

Then, let $\oplus$ be an l-way parallel XOR ($\oplus$), so l-MUX can be realized as:

```
l-MUX(x[l], y[l], c) {
    return MUXCORE(x ⊕ y, c) ⊕ y;
}
```

To check a garbled MUXCORE gadget, the circuit evaluator uses l+1 randomly sampled input bits to obtain the corresponding l+1 input wire-labels, evaluates the l AND gates and verifies that the outcomes are consistent with the commitments/i-hashes (similar to the way garbled ANDs are checked in the underlying LEGO protocol). Note that because every garbled AND gate inside the MUXCORE gadget is checked with uniformly picked inputs, any faulty AND gates in MUXCORE are still detected with the same probability $r_d$ offered by the underlying LEGO protocols.

Referring now to FIG. 4, an example set of application programming interface (API) functions 400 incorporating the techniques described herein (e.g., the pool technique and LEGO-based cut-and-choose technique) are provided. The API allows developers to create and run future secure computation services against active adversaries. A service executing one a server may apply the API in performing secure computations, e.g., with another server running the same service and API. Example use cases for the service may include credit card companies that need to perform secure computations on credit card databases to identify instances of credit card fraud. Another example includes medical research institutions that need to conduct secure cross-database queries over sensitive medical records, which potentially involves private computations in a RAM-based model.

FIG. 4 depicts eight basic functions 400 for the API, four of which handle function inputs (garblerIn, evaluatorIn) and two of which handle outputs (garblerOut, evaluatorOut) while the rest two (and, xor) handle AND and XOR gates, respectively. Note that the API includes two overloaded versions of garblerIn, to be invoked simultaneously by the garbler and the evaluator, respectively. Similarly, the overloaded functions for evaluatorIn are to be invoked simultaneously by the garbler and the evaluator. Since the behaviors of these eight functions depend on their calling party's role (either garbler or evaluator), each function is defined as virtual functions in the base class Party. Each function is associated with concrete implementations in the sub-classes Garbler and Evaluator. Since the data structures representing wires are different on each side, the implementations of wire also differ between the Garbler and the Evaluator.

The API functions 400 provide different ways to specify and execute computations, which are overloaded under the same function name exec. One way reads the circuit description from a circuit file (with an SHDL format) and runs the circuit over the wire encodings supplied as the second argument to exec. Another allows a specification of computations as normal C functions (passed to exec as a function pointer f). Assume the function f only calls AND and XOR, which will be bound to the implementations of AND and XOR functions provided by the API. To facilitate specifying functions in this manner, the API offers a library of circuits such as multiplexers and basic arithmetic circuits. Finally, the initRAM and accessRAM functions of the APIs 300 allow application developers to exploit the efficiency benefits of RAM-based secure computation through Circuit-ORAM.

Figure 5:
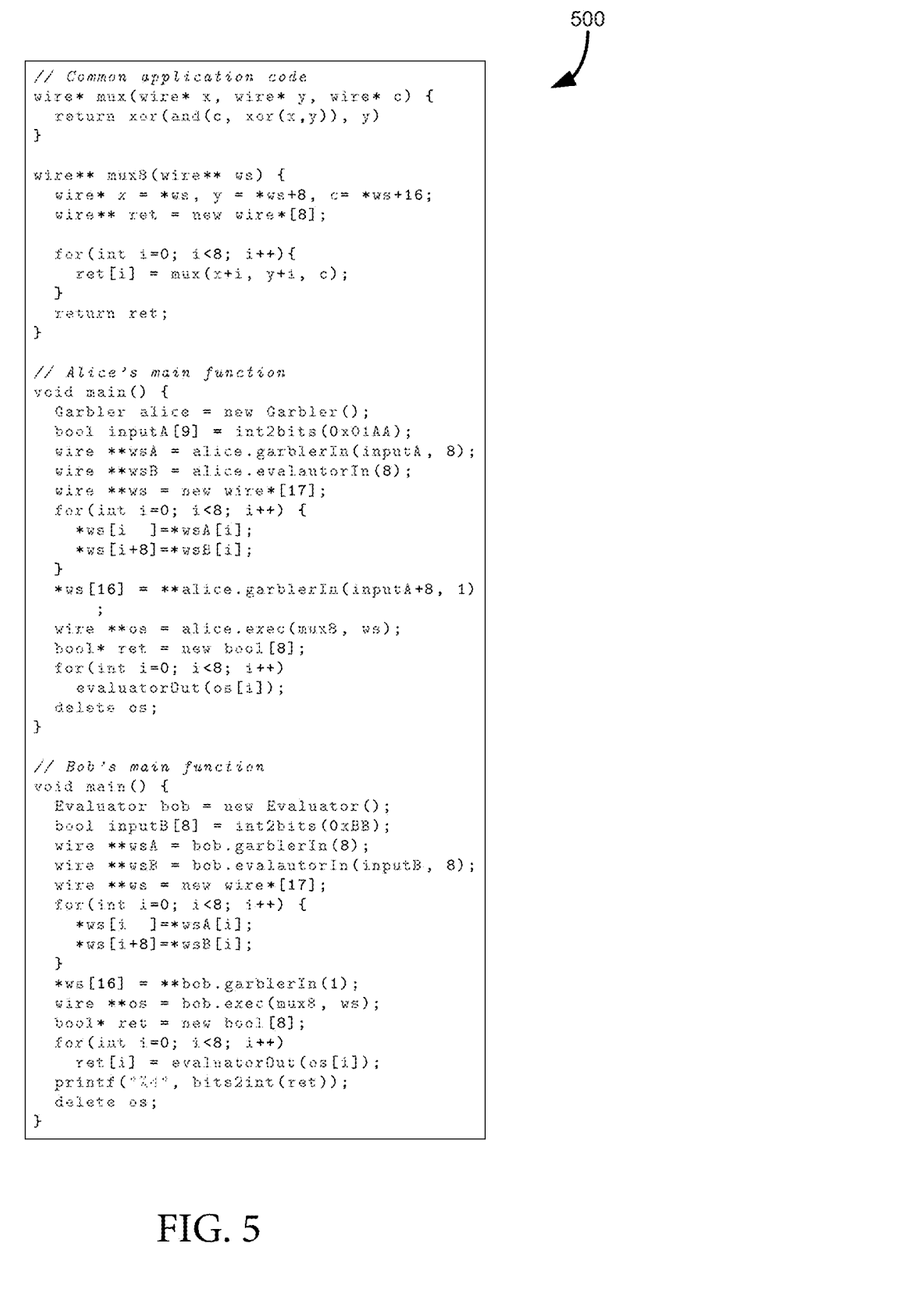
FIG. 5 illustrates a simplified conceptual diagram of at least one embodiment of an example application using the APIs discussed relative to FIG. 4.

Referring now to FIG. 5, an example of applications 500 that use the API functions 400 are shown. The example is for developing a secure MUX to select one of two 8-bit numbers. Note that a developer only needs to write six lines of code to implement mux and mux8 based on ANDs and XORs. The remaining two main functions are template procedures to run/test custom-built applications (mux8, here). Of course, common circuits like mux and mux8 may already be part of the API functions 400, so developers can use them directly without much reproduction of effort.

Implemented naïvely, these protocols could require one round-trip per bucket for the evaluator to disclose his random choice of B garbled gates in the pool to place in a bucket, incurring a significant network round-trip overhead. To alleviate this issue, one approach is to let the garbler maintain an additional buffer (of 128K garbled-gates) per pool so that one round-trip per 128K/B buckets are needed. Thus, empty spots in the pool are refilled with garbled-gates from the buffer. Whenever the buffer is depleted, the garbler will garble and commit 128K gates altogether, after which the evaluator refresh the randomness used to select garbled-gates from the pool till next round of buffer regeneration. Doing so allows helps to exploit the fact that hardware-assisted AES runs faster in batches.

Figure 6:
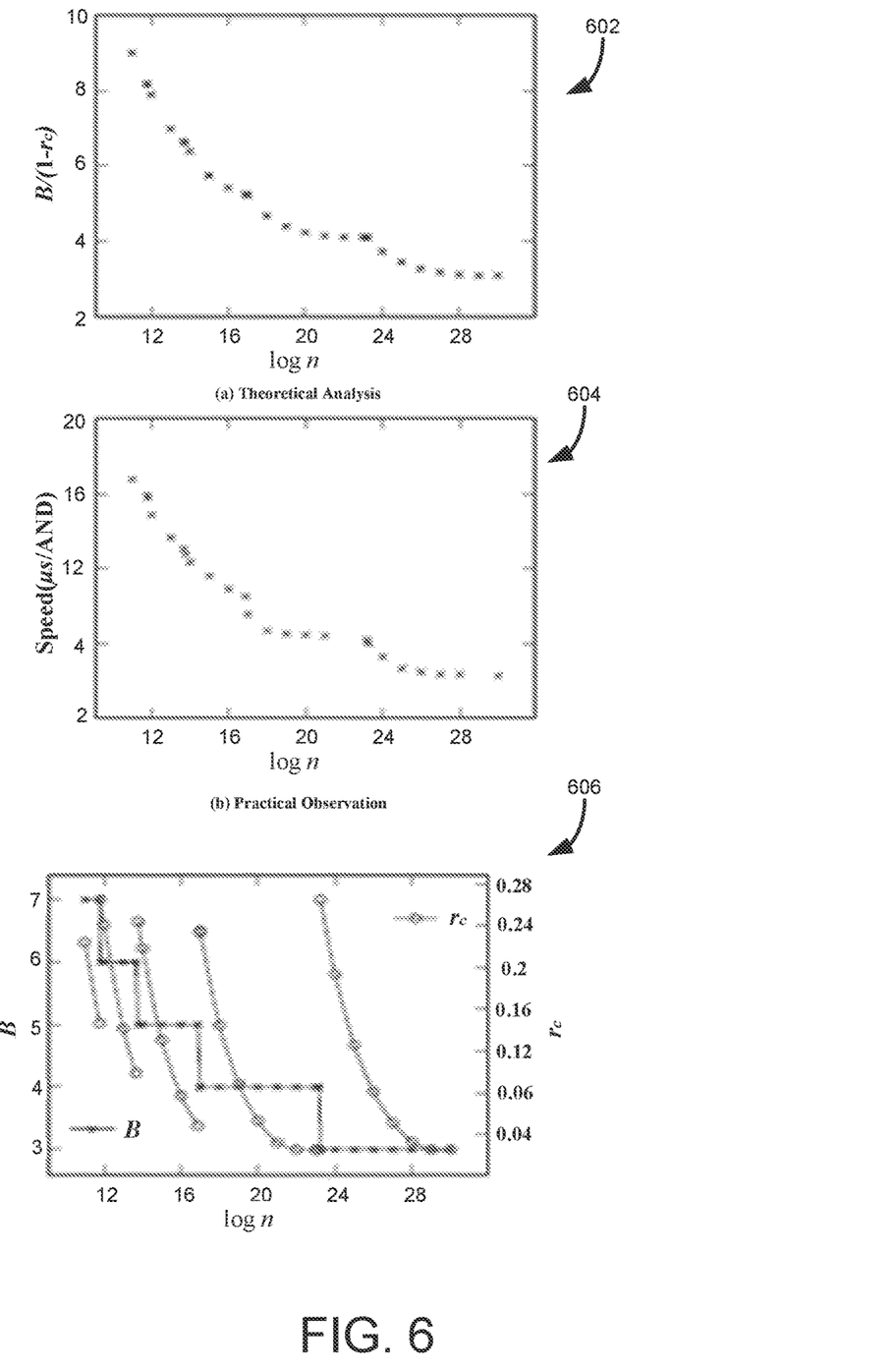
FIG. 6 illustrates example graph diagrams depicting results of an evaluation of secure computation using the techniques described herein according to at least one embodiment embodiment.

Referring now to FIG. 6, example graphs 602, 604, and 606 depicting results of an evaluation of secure computation using the techniques described herein are shown. In this example evaluation, all performance numbers were measured with single-threaded programs. The evaluation was conducted in both LAN (2.5 Gbps bandwidth, <1 ms latency) and WAN (200 Mbps bandwidth, 20 ms latency) settings. The underlying secure computation scheme as described relative to FIG. 3 were used, thus $r_d=\frac{1}{2}$ and $\varepsilon=2^{-40}$.

As stated, the pool size can impact on the throughput of a system. Graph 602 depicts how the system performance changes as a result of varying the pool size. $B/(1-r_c)$ (the y-axis in graph 602) is the expected number of garbled AND gates needed to execute a logical gate. Also note that because the x-axis is on a logarithmic scale, as n increases, $B/(1-r_c)$ drops faster than it appears. Therefore, most of the cost savings might be reaped with relatively smaller n, e.g., $B/(1-r_c) \approx 4$ when n=8M.

Graph 604 shows the relation between the pool size and the actual time cost per logical AND of the pool. Note that the observed data points in graph 604 form a curve of similar shape as that of theoretical estimations in graph 602. A graphical ratio of 2 on the units of the y-axis between the two figures indicates a garbled-gate processing speed of roughly 500K garbled-gates/second, which coincides well with the micro-benchmark of the underlying secure computation protocol.

Compared to running LEGO protocols without a pool, the benefit of the embodiments presented herein is relatively significant. For example, setting $n=2^{20}$ allows a server to execute 100K logical-ANDs/second for circuits of any size, whereas the same speed can only be achieved on running circuits of more than 100K ANDs using the secure computation protocol without a pool. Note that the actual speed measurements also indicate that most efficiency advantage of batched cut-and-choose can be harvested with relatively small pools.

Using the search technique described above, $(B, r_c)$ values were calculated for each fixed pool size to minimize $B/(1-r_c)$. Graph 606 shows, under that premise, how B and $r_c$ changes as n increases. Note that $r_c$ takes continuous values relatively close to 0, whereas B takes discrete integral values. As n grows, B will never increase but the check rate $r_c$ will periodically jump up (synchronized with the changes in B) and then gradually decrease as n increases while B holds the same.

Figure 7:
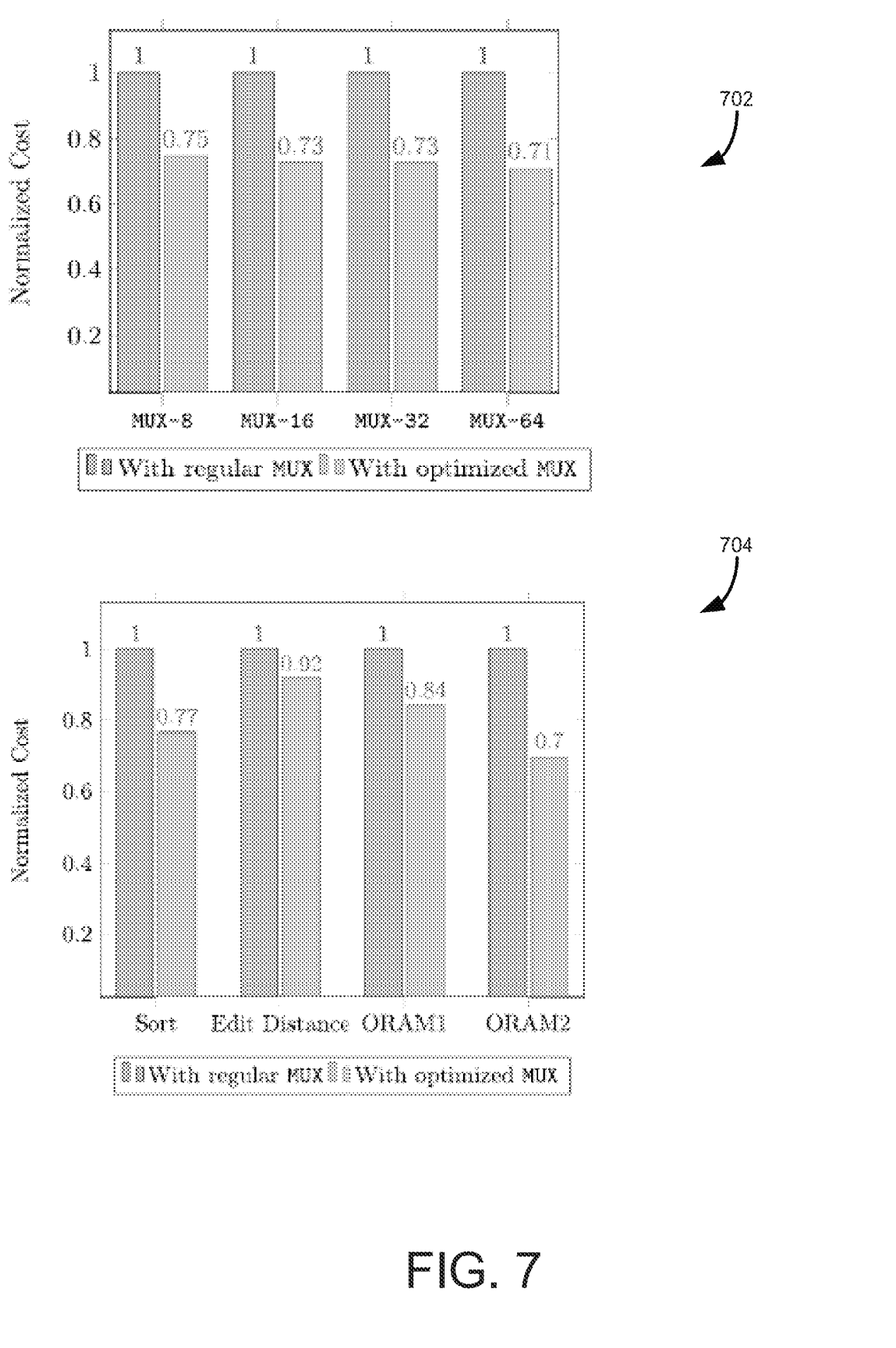
FIG. 7 illustrates example graph depicting efficiency gain resulting from performing secure computation using the techniques described herein, according to at least one embodiment.

Referring now to FIG. 7, example graphs 702 and 704 depicting efficiency gain resulting from performing secure computation using the techniques described herein, according to an embodiment. In particular, graphs 702 and 704 shows the savings in computing oblivious multiplexers due to the use of MUXCORE gadgets. The overhead of MUX of various widths are reduced by about 30%, which is largely in line with a theoretical estimation based on the wire reduction rate and the fraction of overall overhead (60-70%) spent on processing wires. Graph 704 shows 8-30% improvements in using the technique over several applications using multiplexers as building blocks.

In an embodiment, another search technique for identifying a cut-and-choose parameter for a given circuit size and a security probability may be applied herein. In particular, the pooling techniques described herein may also be adapted to work with an authenticated-garbling-based secure computation protocol. The protocol is a constant-round two-party computation protocol based on authenticated multiplicative triples, i.e., $(a_1 \oplus a_2)(b_1 \oplus b_2)=c_1 \oplus c_2$ where $a_1, a_2, b_1, b_2, c_1, c_2 \in \{0,1\}$. This protocol includes a preparation phase to generate a linear (in the circuit size) number of such triples and distribute them properly between the two parties. That is, $P_1$ holds three bits $a_1, b_1, c_1$ and their authentication tags (128-bit each) $\langle a_1 \rangle, \langle b_1 \rangle, \langle c_1 \rangle$ that allow $P_1$ to later prove to $P_2$ the use of authentic values of $a_1, b_1, c_1$ when needed. Similarly, $P_2$ holds a2, b2, c2 and $\langle a_2 \rangle, \langle b_2 \rangle, \langle c_2 \rangle$. Using each authenticated multiplicative triple, the parties collaboratively garble a binary AND gate such that (1) the permutation of the garbled entries are determined by the authenticated random bits from both parties, and (2) a honestly garbled entry in the table can always be verified upon decryption. As a result, although a malicious garbler could render some garbled entries invalid, it could not gain any information by observing failed gate evaluations because in the adversary's perspective the failures always happen at random places. A significant cost of the protocol results from the preparation phase that generates the authenticated multiplicative triples.

The preparation phase also uses bucketing and batched cut-and-choose, except that it not only detects faults in the generation of every multiplicative triple with probability ½, but also allows all checked triples to be used to form buckets. Thus, to specialize the pool technique for this protocol, $r_c$ is set to 1 (since all triples are checked) and $r_d=\frac{1}{2}$. Therefore, assuming the bucket size B is a constant, the success rate of the best attacking strategy becomes $$\max_b 2^{-b} \cdot P_b(n, b) \quad (2)$$

where b can be any positive integer (but essentially bounded by $\lfloor \log_{1-r_c r_d} \epsilon \rfloor$) and the analysis of $P_b$ (n, b) is identical to that previously discussed relative to search technique described above, the protocol only requires a single honestly generated multiplicative triple in each bucket to ensure security. As $r_c$ is fixed to 1, the parameter selection procedure can be simplified by the algorithm 700. Thus, the protocol provides improved scalability and eliminates long stalls and relatively large storage requirements when executing large circuits.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The techniques described may also be implemented, e.g., on a system that has a processor and a memory that stores program code, which, when executed on the processor, performs the functions of the secure computation service. The techniques may also be implemented via a computer-readable storage medium storing instructions, which, when executed on the processor, performs the functions of the secure computation service.

A plurality of advantages of the present disclosure arise from the various features of the method, computer-readable storage medium, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

What is claimed is:

1. A computer-implemented method for performing secure computation of a function circuit represented as a plurality of buckets, each bucket representing a logical AND gate, the computer-implemented method comprising:
    generating, by execution of one or more processors, a pool having a plurality of garbled AND gates;
    randomly selecting at least one of the garbled AND gates from the pool for placement in one of the plurality of buckets;
    determining, by an evaluation of the selected garbled AND gates, an output of the bucket, the output representing an execution of the logical AND gate; and
    applying the determined output as a parameter in a secure protocol.

2. The computer-implemented method of claim 1, further comprising, inserting additional garbled AND gates into the pool.

3. The computer-implemented method of claim 1, wherein the selected garbed AND gates are evaluated by execution of a BatchedCut protocol.

4. The computer-implemented method of claim 3, wherein the BatchedCut protocol is a Large Efficient Garbled-circuit Optimization (LEGO) protocol.

5. The computer-implemented method of claim 1, further comprising, determining, in the plurality of garbled AND gates, whether a faulty garbled AND gate exists in the pool.

6. The computer-implemented method of claim 1, wherein the random selection of the at least one of the garbled AND gates is performed based on a collaborative coin-tossing protocol.

7. The computer-implemented method of claim 1, further comprising:
    generating a hash for each of the plurality of garbled AND gates; and
    storing the hash for each of the plurality of garbled AND gates in a Merkle tree.

8. A non-transitory computer-readable storage medium, which, when executed on one or more processors, performs an operation for performing secure computation of a function circuit represented as a plurality of buckets, each bucket representing a logical AND gate, the operation comprising:
    generating a pool having a plurality of garbled AND gates;
    randomly selecting at least one of the garbled AND gates from the pool for placement in one of the plurality of buckets;
    determining, by an evaluation of the selected garbled AND gates, an output of the bucket, the output representing an execution of the logical AND gate; and
    applying the determined output as a parameter in a secure protocol.

9. The non-transitory computer-readable storage medium of claim 8, wherein the operation further comprises, inserting additional garbled AND gates into the pool.

10. The non-transitory computer-readable storage medium of claim 8, wherein the selected garbed AND gates are evaluated by execution of a BatchedCut protocol.

11. The non-transitory computer-readable storage medium of claim 10, wherein the BatchedCut protocol is a Large Efficient Garbled-circuit Optimization (LEGO) protocol.

12. The non-transitory computer-readable storage medium of claim 8, wherein the operation further comprises, determining, in the plurality of garbled AND gates, whether a faulty garbled AND gate exists in the pool.

13. The non-transitory computer-readable storage medium of claim 8, wherein the random selection of the at least one of the garbled AND gates is performed based on a collaborative coin-tossing protocol.

14. The non-transitory computer-readable storage medium of claim 8, wherein the operation further comprises:
    generating a hash for each of the plurality of garbled AND gates; and
    storing the hash for each of the plurality of garbled AND gates in a Merkle tree.

15. A system, comprising:
    one or more processors; and
    a memory storing program code, which, when executed on the one or more processors, performs an operation for performing secure computation of a function circuit represented as a plurality of buckets, each bucket representing a logical AND gate, the operation comprising:
        generating a pool having a plurality of garbled AND gates;
        randomly selecting at least one of the garbled AND gates from the pool for placement in one of the plurality of buckets;

determining, by an evaluation of the selected garbled AND gates, an output of the bucket, the output representing an execution of the logical AND gate; and applying the determined output as a parameter in a secure protocol.

16. The system of claim 15, wherein the operation further comprises, inserting additional garbled AND gates into the pool.

17. The system of claim 15, wherein the selected garbed AND gates are evaluated by execution of a BatchedCut protocol and wherein the BatchedCut protocol is a Large Efficient Garbled-circuit Optimization (LEGO) protocol.

18. The system of claim 15, wherein the operation further comprises, determining, in the plurality of garbled AND gates, whether a faulty garbled AND gate exists in the pool.

19. The system of claim 15, wherein the random selection of the at least one of the garbled AND gates is performed based on a collaborative coin-tossing protocol.

20. The system of claim 15, wherein the operation further comprises:

generating a hash for each of the plurality of garbled AND gates; and storing the hash for each of the plurality of garbled AND gates in a Merkle tree.

* * * * *